United States Patent Office
3,436,416
Patented Apr. 1, 1969

3,436,416
OPTICALLY ACTIVE DIFUNCTIONAL
ORGANOSILICON COMPOUNDS
Herman L. Finkbeiner, R.D. 1, Charlton Road, Ballston
Lake 12302, and Johann F. Klebe, 922 Morgan Ave.
12309, both of Schenectady, N.Y.
No Drawing. Filed Aug. 2, 1966, Ser. No. 569,618
Int. Cl. C07f 7/04, 7/18
U.S. Cl. 260—448.8                                7 Claims The present invention relates to optically active difunctional organosilicon compounds and methods for their preparation.

Heretofore, the optically active organosilicon compounds known to the prior art were either non-functional organosilicon compounds or mono-functional organosilicon compounds. Thus, the prior art compounds either contained no reactive groups or only one reactive group, thereby limiting their usefulness in the preparation of the siloxanes of modern commercial importance.

It is the object of this invention to provide new optically active organosilicon compounds having two hydrolyzable sites on the asymmetric silicon atom. It is another object of this invention to provide practical synthetic routes for the preparation of compounds of the type described above. Other objects and advantages will be apparent from the following specification.

The optically active organosilanes and organo-siloxanes of this invention are those having the formula I   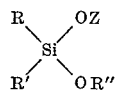

wherein R is a monovalent hydrocarbon radical, a halogenated monovalent hydrocarbon radical or a cyanoalkyl group, R' is a different radical than R and is selected from the class consisting of monovalent hydrocarbon radicals, halogenated monovalent hydrocarbon radicals or cyanoalkyl radicals, R'' is a member of the class consisting of methyl radicals and

groups, where R''' is a monovalent hydrocarbon radical, a halogenated monovalent hydrocarbon radical or a cyanoalkyl group, and Z is a monovalent hydrocarbon radical having a molecular weight greater than 15, a

group where $R^4$ is a monovalent hydrocarbon radical or an —Si—$R^1_3$ group wherein $R^1$ is a monovalent hydrocarbon radical, halogenated monovalent hydrocarbon radical or a cyanoalkyl group and is different from R''' when R''' is present and wherein R, R', R'', R''' and Z are free of active hydrogens as determined by the Zerewitinoff method. It is of importance to note that although R and R' are selected from the same group, in order to obtain optically active silicon compounds, these groups must of necessity be different. For example, when R is a methyl group, R' must be another group such as ethyl, phenyl, 4-chlorophenyl and the like.

The monovalent hydrocarbon radicals which R and R' represent are alkyl radicals including cycloalkyl radicals, e.g., methyl, ethyl, propyl, isopropyl, butyl, hexyl, cyclohexyl, etc.; aryl radicals, e.g., phenyl, naphthyl, biphenyl, anthracenyl, etc.; aralkyl radicals, e.g., benzyl, phenylethyl, etc.; alkaryl radicals, e.g., tolyl, xylyl, ethylphenyl, trimethylphenyl, etc.; alkenyl groups, e.g., vinyl, allyl, butenyl, methallyl, etc.; cyanoalkyl groups, e.g., cyanomethyl, cyanoethyl, cyanopropyl, cyanobutyl, etc., and the halohydrocarbon radicals are, e.g., chlorophenyl, bromophenyl, trifluoropropyl, trifluoromethylphenyl, bromonaphthyl, chloropropyl, etc. The monovalent hydrocarbon radicals, halogenated monovalent hydrocarbon radicals and cyanoalkyl radicals represented by R''' and $R^1$ are those set forth above for R and R'. The monovalent hydrocarbon radicals which $R^4$ represent are the alkyl, cycloalkyl, aryl, aralkyl and alkaryl groups set forth above for R and R'.

Illustrative of the optically active organosilanes included in Formula I are, e.g., methyphenylmethoxy-α-naphthoxysilane, ethylbutylmethoxypropoxysilane, vinyl-(phenylethyl) - methoxybutoxysilane, methylphenyl-α-naphthoxy - (trimethylsiloxy)silane, vinylbutylmethoxy(triphenylsiloxy)silane, etc.

In accordance with the process of this invention, the optically active organosilicon compounds of Formula I are produced in accordance with the following stepwise process:

An optically active sila-oxazolidone of the formula

II   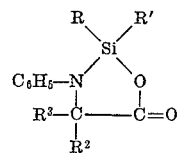

where R and R' have the above-defined meanings and $R^2$ and $R^3$ are different monovalent radicals selected from the class consisting of hydrogen or monovalent hydrocarbon radicals, is treated with an equivalent amount of organic compound having the formula

III         Z—OH wherein Z has the above-defined meanings, at a temperature of from 0° to 100° C. for about 15 to 30 minutes, to form an intermediate reaction product of the formula IIIA   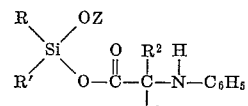

where R, R', $R^2$, $R^3$ and Z are as above-defined. To the reaction mixture containing the intermediate reaction product of the Formula IIIA is then added from 2 to 5 moles of methanol per mole of the starting sila-oxazolidone, while maintaining the solution at from between 0° C. and 50° C. The solution is then filtered and the filtrate concentrated in vacuum at room temperature. After removal of the solvent and the excess reactant, the optically active organosilicon compound of Formula I can be recovered by extraction or distillation at reduced pressures.

In an alternative procedure, water is reacted with the reaction mixture containing the intermediate reaction product IIIA to yield an optically active silanol of the formula IV   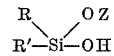

wherein R, R' and Z have the above-defined meanings. In-as-much as the silanol is relatively unstable, it is converted into an optically active solaxane by further reaction with a silylating agent such as bis-N,N-(trihydrocarbonsilyl)hydrocarbonamide, e.g., bis-N,N-(trimethylsilyl)acetamide. The optically active solixane having the gereral formula V   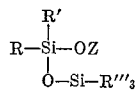

wherein R, R', R''' and Z are as above-defined is recovered by extraction and distillation techniques.

The ratio of the reactants employed in the process of this invention should be carefully regulated and it is preferred that one mole of the compound of the formula Z—OH be employed for each mole of the optically active sila-oxazolidone starting material. If lesser amounts than equal molar quantities are employed, a complete reaction will not result and renders the isolation of the optically active silane more difficult. If greater amounts of Z—OH are employed, impurities are introduced, thereby again rendering reparation of the optically active silane difficult.

The amounts of methanol or water added at the second step of this process is also important. One adds from a 2 to 5 molar excess of methanol in order to insure completeness of reaction. When lesser or greater amounts of methanol is employed, the reaction yields by-products which are difficultly separable from the desired optically active organosilicon compound. When water is employed in the second reaction step it is added in amounts of from 1.0 to 1.5 moles per mole of the starting optically active sila-oxazolidone. Greater amounts than 1.5 moles of water per mole of the starting sila-oxazolidone are detrimental anl yields by-products which are difficultly separable from the reaction mixture.

The temperature at which the process of this invention is conducted should be maintained below about 100° C. In the second step, it is preferred that the reaction with methanol or water be conducted in the range of 0° to 50° C., since temperatures above this lead to racemization of the intermediate optically active silyester.

Although a solvent is not necessary in conducting the present process, for ease of operation and simplicity, it is preferred to employ a solvent. Among the solvents which can be employed in the present process are included benzene, toluene, xylene, chloroform, carbon tetrachloride, dioxane, tetrahydrofuran, etc.

It is also important that during the conducting of the process of this invetnion the reaction system be maintained in a neutral sate (i.e., pH=7). Therefore, all reactants should be neutral when added to the reaction process of this invention.

The optically active sila-oxazolidone starting materials employed in the present invention are prepared by simply mixing equal molar quantities of an optically active N-phenyl-α-aminoacid of the formula VI 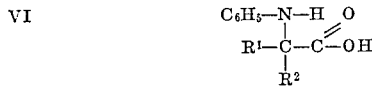

wherein $R^1$ and $R^2$ are as above-defined with an amidosilane of the formula

VII 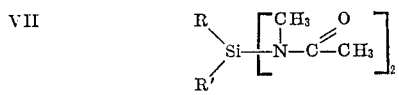

wherein R and R' have the above-defined meanings in a solvent such as benzene, chloroform or carbon tetrachloride at ambient temperatures and then recovering the optically active sila-oxazolidones by distillation or by fractional crystallization. This preparation is more fully set forth in our copending application Ser. No. 569,566 filed concurrently herewith and assigned to the same assignee as the present invention, which application is made part hereof by reference.

It is an important feature of the process of preparing the optically active sila-oxazolidones that an N-phenyl substituted α-aminoacid be employed. It was unexpectedly found that although two diastereomers could be and are, in fact, produced by this reaction, where the asymmetric silicon atom is either dextro or levo, one of the diastereomers is unstable insofar as the asymmetric silicon atom is concerned and rearranges to yield a single type of an optically asymmetric silicon atom. This phenomenon allows one to recover a single optically active species initead if a mixture of two such species and eliminates a very difficult separation problem generally found in these instances. Illustrative of the N-phenyl-α-amnoacids that can be employed in preparing the starting materials is d or l N-phenylalanine, d or l N-phenylphenylalanine, d or l N-phenyl-α-aminobutyric acid, d or l N-phenylvaline, d or l N-phenylnorvaline, d or l N-phenylleucine, d or l N-phenylisoleucine, the r or l N-phenylnorleucine, etc.

An important aspect of the synthesis of optically active difunctional silanes via the sila-oxazolidones is the ability to obtain the dextro or the levo form of any particular difunctional silane simply by proper choice of the N-phenylaminoacid used for the sila-oxazolidone preparation, e.g., the sila-oxazolidone from (+) N-phenylalanine can be transformed into methoxynaphthoxy-methylphenylsilane with a positive optical rotation, while the analogous reaction sequence starting with (+) N-phenylvaline leads to the chemically identical end product having a negative critical rotation.

The bis-N,N-(trihydrocarbonsilyl)hydrocarbonamides employed in the alternative procedure of this invention are those of the formula VIII 

wherein W and W' are the monovalent hydrocarbon radicals as set forth above for R and R'. These silyl hydrocarbon amides are produced by the reaction of one mole hydrocarbon amide with two moles of a trihydrocarbonchlorosilane in the presence of at least two moles of tertiary amine, e.g., triethylamine, pyridine, quinoline, etc., at ambient temperatures in accordance with the following equation which for simplicity shows the reaction of acetamide with trimethylchlorosilane employing triethylamine.

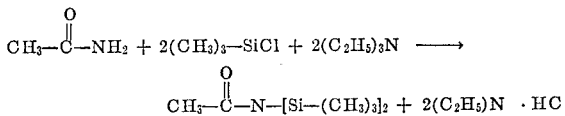

It is of course apparent to those skilled in the art that other amides, chlorosilanes and tertiary amines may be substituted in the above equation to produce a wide variety of the silylated amides.

The following examples serve to further illustrate the invention. All parts are by weight unless otherwise expressly set forth. The optically active sila-oxazolidones employed in the examples were prepared as set forth in our above-mentioned copending application.

EXAMPLE 1

Optically active 2 - (methylphenylsila) - 3 - phenyl-4-methyloxazolidone-5, $[\alpha]_D^{25}=27.5°$, 5.59 grams was dissolved in 15 cubic centimeters of dry benzene at room temperature. To the benzene solution was added 2.70 grams of α-naphthol. A clear solution was formed within a few minutes. This solution was stirred under anhydrous conditions at 30° C. for about 20 minutes. A nuclear magnetic resonance spectrum taken at this point showed the formation of naphthoxymethylphenylsilyl-N-phenylalanine ester to be essentially complete. This solution was chilled to just above its freezing point and anhydrous methanol (3.2 grams) was added. Within a few minutes, the reaction of the methanol with the naphthoxymethylphenylsilyl-N-phenylalanine ester was complete. The solution was filtered and benzene and excess methanol were then removed in vacuo at room temperature. Hexane was then added to extract the silane. Concentration of the hexane solution after filtration to remove a little residual optically active N-phenylalanine yielded a colorless syrup which was purified by distillation, B.P. 130–135°/35 M.

*Analysis.*—C, 73.21; H, 6.08; Si, 9.75. Calc. for $C_{10}H_{18}O_2Si$: C, 73.45; H, 6.16; Si, 9.54.

The optical rotation of a solution of 101.8 milligrams of the silane in benzene, total weight 1.141 grams, gave a value of α=+1.72. This leads to a value for the optical rotation of naphthoxymethoxymethylphenylsilane of $$[\alpha]_D^{25} = \frac{1.72 \times 1141}{101.8 \times 0.88} = +21.9$$

The N-phenylalanine recovered by filtration from the reaction mixture had the same optical rotations as prior to the sila-oxazolidone formation.

EXAMPLE 2

Optically active 2 - (methylphenylsila) - 3 - phenyl-4-isopropyloxazolidone-5 ($[\alpha]_D^{25}=-38.0°$, 0.65 gram) was dissolved in benzene (1 cc.) and α-naphthol (0.28 gram) added with stirring at 35° C. After the addition was complete, the mixture was stirred for 25 minutes at which time a nuclear magnetic resonance spectrum indicated that the α-naphthol had reacted completely with the oxazolidone. The solution was then treated with methanol (0.32 gram, a 5-fold excess) and the mixture stirred at 35° C. for 15 minutes. The excess methanol was then removed under vacuum and the residue extracted with hexane. The hexane solution contained the silane. The hexane was distilled off and the product distilled to yield optically active methylphenylnaphthoxymethoxysilane B.P. 130° C. at 40 microns pressure and which had a specific rotation of $[\alpha]_D^{25}=-4.90$.

EXAMPLE 3

Optically active 2 - (methylphenylsila) - 3 - phenyl-4-methyloxazolidone-5 ($[\alpha]_D^{25}=-27.5°$, 3.11 grams) was dissolved in 6 grams of dry benzene. α-Naphthol (1.50 grams) was added to the solution and the mixture stirred for 20 minutes at 30° C. A nuclear magnetic resonance spectrum at the point indicated that the α-naphthol had reacted completely with the oxazolidone. The benzene was removed by vacuum stripping at 0° C., to yield a syrup. The syrup was dissolved in dry dioxane (5.5 grams) and the solution stored at Dry Ice temperature. The solution was removed from the Dry Ice, allowed to thaw and 216 mg. of water added. The mixture was turbid initially, however, it became clear upon warming to room temperature. The solution was allowed to stand at 30° C. for 30 minutes. N,N - bis - trimethylsilylacetamide (5.1 grams) was added. The low boiling components were removed by heating in a 160° C. bath at 0.5 mm. Hg. The residue was distilled to yield trimethylsiloxy-α-naphoxyphenylmethylsilane (B.P. 125–130° C. at 0.03 mm. Hg) having the formula

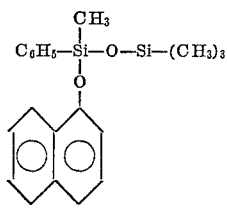

The silane had a specific rotation of $[\alpha]_D^{25}=-12.8°$ when measured in a standard cell.

*Analysis.*—C. 68.44; H, 6.86; Si, 15.91. Calc. for $C_{20}H_{24}OSi_2$: C, 68.20; H, 6.86; Si, 15.95.

The optically active organosilicon compounds of this invention are useful as lubricants, water-proofing agents, damping fluids and the like. The organosilicon compounds of this invention, in addition, can be cohydrolyzed with a dichlorosilane, e.g., dimethyldichlorosilane to yield rubbery siloxanes which can be compounded with fillers such as finely divided silica and a curing catalyst such as benzoyl peroxide and heat-cured to yield organopolysiloxane elastomers useful as gaskets, shock absorbers, insulation, etc.

What is claimed as new and is desired to be secured by Letters Patent of the United States is:

1. An optically active organosilicon compound having the formula

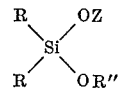

wherein R is a monovalent hydrocarbon, halogenated hydrocarbon or cyanoalkyl group, R′ is a monovalent hydrocarbon, halogenated hydrocarbon or cyanoalkyl group and is a different group from R, R″ is a methyl group, or an

group where R‴ is a monovalent hydrocarbon, halogenated hydrocarbon or cyanoalkyl group, Z is a member of the class consisting of monovalent hydrocarbon radicals having a molecular weight greater than 15,

group and —Si—$R^1_3$ group where $R^4$ is a monovalent hydrocarbon radical and $R^1$ is a member of the class consisting of monovalent hydrocarbon radicals, halogenated monovalent hydrocarbon radicals and cyanoalkyl groups, R, R′, R″, R‴ and Z being free of active hydrogens as determined by the Zerewitinoff method.

2. An optically active organosilicon compound as claimed in claim 1 having the formula

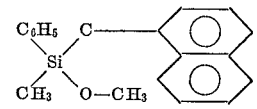

3. An optically active organosilicon compound as claimed in claim 1 having the formula

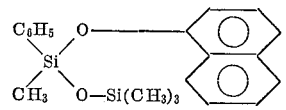

4. The proceess for the production of an optically active organosilicon compound of the formula

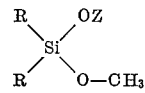

wherein R is a monovalent hydrocarbon radical, a halogenated monovalent hydrocarbon radical or a cyanoalkyl group, R′ is a different radical than R and is selected from the class consisting of monovalent hydrocarbon radicals, halogenated monovalent hydrocarbon radicals, and cyanoalkyl radicals, Z is a member of the group consisting of monovalent hydrocarbon radicals having a molecular weight greater than 15, a

group, where $R^4$ is a monovalent hydrocarbon radical, and Si—$R^1_3$ groups, wherein $R^1$ is a monovalent hydrocarbon radical, halogenated monovalent hydrocarbon radical or a cyanoalkyl group, R, R′ and Z being free of active hydrogens as determined by the Zerewitinoff method which comprises forming an admixture of an optically active sila-oxazolidone of the formula

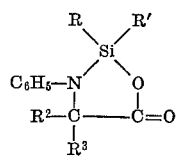

wherein R and R' are as above-defined and $R^2$ and $R^3$ are different radicals selected from the group consisting of hydrogen and monovalent hydrocarbon radicals, and a compound of the formula $$Z\text{---}OH$$

where Z has the above-defined meaning and maintaining said admixture at a temperature at which said ZOH and said sila-oxazolidone react to produce an intermediate reaction product, thereafter adding to said reaction mixture containing said intermediate reaction product from 2 to 5 moles of methanol per mole of said sila-oxazolidone starting material, and maintaining said mixture at a temperature of from 0 to 50° C. to produce said optically active organosilicon compound.

5. The process for producing an optically active organosilicon compound of the formula

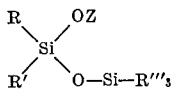

wherein R is a monovalent hydrocarbon radical, a halogenated monovalent hydrocarbon radical or a cyanoalkyl group, R' is a different radical than R and is selected from the class consisting of monovalent hydrocarbon radicals, halogenated monovalent hydrocarbon radicals and cyanoalkyl groups, R''' is a member of the group consisting of monovalent hydrocarbon radicals, halogenated monovalent hydrocarbon radicals and cyanoalkyl groups, and Z is a monovalent hydrocarbon radical having a molecular weight greater than 15, a

group where $R^4$ is a monovalent hydrocarbon radical or an Si—$R^1{}_3$ group, wherein $R^1$ is a monovalent hydrocarbon radical, a halogenated monovalent hydrocarbon radical or a cyanoalkyl group and is different from R''' which comprises forming an admixture of an optically active sila-oxazolidone having the formula

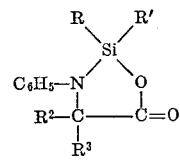

wherein R and R' have the above meaning and $R^2$ and $R^3$ are different radicals selected from the class consisting of hydrogen and monovalent hydrocarbon radicals with an organic compound of the formula $$Z\text{---}OH$$

and maintaining said admixture at a temperature of from 0 to 100° C. to form an intermediate reaction product, thereafter adding to said intermediate reaction product from 1.0 to 1.5 moles of water per mole of the optically active sila-oxazolidone and maintaining said mixture at a temperature of from 0° C. to 30° C. to form a second intermediate reaction product, thereafter adding to said reaction mixture an N,N-bis-trihydrocarbonsilylhydrocarbonamide silylating agent and maintaining said mixture at a temperature at which said hydrocarbonamide and said second intermediate reaction product react to produce the optically active organosilicon compound desired.

6. A process as claimed in claim 5, wherein R is a methyl group, R' is a phenyl group and Z is a naphthyl group.

7. A process as claimed in claim 5, wherein R is a methyl group, R' is a phenyl group, Z is a naphthyl group and R''' is a methyl group.

References Cited

UNITED STATES PATENTS 3,024,262   3/1962   Sommer et al. _____ 260—448.2

TOBIAS E. LEVOW, *Primary Examiner.*

P. F. SHAVER, *Assistant Examiner.*

U.S. Cl. X.R.

260—448.2, 37, 46.5; 252—49.6; 106—13